(12) United States Patent
Wang

(10) Patent No.: US 8,127,463 B2
(45) Date of Patent: Mar. 6, 2012

(54) VACUUM DRYING APPARATUS OF CIRCULATIVE PREHEATING TYPE

(76) Inventor: Ban Chih Wang, Taichung (TW)

( * ) Notice: Subject to any disclaimer, the term of this patent is extended or adjusted under 35 U.S.C. 154(b) by 512 days.

(21) Appl. No.: 12/318,611

(22) Filed: Jan. 2, 2009

(65) Prior Publication Data
US 2010/0170102 A1   Jul. 8, 2010

(51) Int. Cl.
F26B 19/00 (2006.01)
F26B 25/00 (2006.01)
G05G 3/00 (2006.01)

(52) U.S. Cl. ............ 34/216; 34/209; 34/210; 34/218; 34/236; 74/575; 74/577 R

(58) Field of Classification Search .......... 34/209, 34/216, 218, 236, 210; 219/389; 418/7; 74/575, 577 R, 725, 813 R
See application file for complete search history.

(56) References Cited

U.S. PATENT DOCUMENTS

| 3,144,310 | A | * | 8/1964 | Glatt et al. | 34/186 |
| 4,127,947 | A | * | 12/1978 | Webb et al. | 34/92 |
| 7,347,007 | B2 | * | 3/2008 | Maguire | 34/493 |
| 2010/0264141 | A1 | * | 10/2010 | Tarlow et al. | 220/203.01 |

* cited by examiner

Primary Examiner — Kenneth Rinehart
Assistant Examiner — John McCormack
(74) Attorney, Agent, or Firm — Charles E. Baxley

(57) ABSTRACT

A vacuum drying apparatus of a circulative preheating type comprises a working area, containing a material-filling-preheating sub-area, a heating sub-area, a drying sub-area, and a material-discharging sub-area; a rotatable frame, rotatably installed in the working area and having four accommodating spaces corresponding to the sub-areas of the working area, respectively; four cylinders, installed in the accommodating spaces of the rotatable frame and corresponding to the sub-areas of the working area; and a driving assembly, connected to and thereby driving the rotatable frame to rotate; wherein when the rotatable frame rotates, each of the cylinders is moved from a currently corresponding sub-area to an adjacent said sub-area. Thereby, since the cylinders have been preheated in the material-filling-preheating sub-area before receiving a heating procedure in the heating sub-area, a required duration of the heating procedure can be reduced.

7 Claims, 6 Drawing Sheets

VACUUM DRYING APPARATUS OF CIRCULATIVE PREHEATING TYPE

BACKGROUND OF THE INVENTION

1. Technical Field

The present invention relates to drying apparatuses, and more particularly, to a vacuum drying apparatus that uses technologies of condensation and vacuum to dry surfaces of granulous or powdered substances.

2. Description of Related Art

For an injection-molding device, it is preferred that plastic material granules processed therein are dry enough to produce products of satisfying quality.

A conventional drying apparatus comprises a hopper, a heater and a blower. When material granules are loaded into the hopper, the heater heats an ambient air for the blower to blow the heated air into the hopper so that moisture contents at surfaces of the material granules and in the hopper can be evaporated due to a high heat provided by the heated air.

However, such assembly of the hopper, the heater and the blower is bulky. On the other hand, in the conventional drying apparatus, procedures of material filling, heating drying and material discharging are performed at an identical position. Stating differently, not until a batch of material granules is processed and discharged, a next batch of material granules can not be loaded for a next cycle of material filling, heating drying and material discharging. Therefore, an overall drying process is time-consuming and, consequently, an efficiency of the injection-molding device is inferior.

Moreover, since the drying process where the heated air is used to evaporate the moisture contents at the surfaces of the material granules causes the surfaces of the material granules heated, in order to avoid condensation caused by a drop in temperature at the surfaces of the material granules when the heated material granules are transferred in to a molding machine, a timing for transferring the material granules has to be well controlled.

The U.S. Pat. No. 6,154,980 provides a dryer comprising a plurality of hoppers. The plural hoppers are rotatable to circulate among positions so as to receive different drying procedures at the different positions. For example, when one said hopper is at a material filling and heating position, a material filling and heating procedure is performed to evaporate moisture contents in the material granules. When the hopper shifts to a vacuum drying position, a vacuum drying procedure is conducted to the hopper so as to vacuum the hopper and thereby evacuate moisture contents therefrom. When the hopper is at a material discharge position, the material granules in the hopper are discharged. While the prior art device teaches a circulative drying process, the heating procedure is the outstandingly time-consuming part among all the process. Generally speaking, a heating temperature up to 150° C. and a heating duration of 25 to 30 minutes are required. After positioned at the material filling and heating position for 30 minutes, the hopper can be moved to the vacuum drying position and then the drying procedure can be done in 3 to 5 minutes. At this time, however, since the heating procedure for another said hopper at the material filling and heating position has not been finished yet, it needs 25 minutes more to get the hoppers moved again. Thus, it takes about one hour for each said hopper to undergo all the procedures from material filling through material discharge and the material discharge can be only performed every 30 minutes. Consequently, to the entire process, the heating drying procedure is either time-consuming or unsatisfying in its drying effect.

SUMMARY OF THE INVENTION

In view of the shortcomings of the prior drying device requiring long drying time, having inferior efficiency, and needing accurate temperature as well as transferring timing controls, the present invention herein provides a novel drying apparatus.

One objective of the present invention is to provide a vacuum drying apparatus of a circulative preheating type, which facilitates reducing an overall drying duration.

Another objective of the present invention is to provide a vacuum drying apparatus of a circulative preheating type, which facilitates enhancing a drying effect.

To achieve the above objectives, the vacuum drying apparatus with the circulative preheating function comprises a working area that contains a material-filling-preheating sub-area, a heating sub-area, a drying sub-area, and a material-discharging sub-area; a rotatable frame, rotatably installed in the working area and having four accommodating spaces corresponding to the sub-areas of the working area, respectively; four cylinders, installed in the accommodating spaces of the rotatable frame and corresponding to the sub-areas of the working area, in which the cylinders are defined as a preheating cylinder, a heating cylinder, a vacuum drying cylinder, and a material-discharging cylinder, respectively, according to the sub-areas the cylinders are corresponding to; and a driving assembly, connected to and thereby driving the rotatable frame to rotate.

When the rotatable frame is driven by the driving assembly to rotate, it in turn drives each of the cylinders to move from a currently corresponding sub-area to an adjacent said sub-area. Since a hot air have been introduced into the preheating cylinder to rise an inside temperature thereof, after the cylinder is positioned in the heating sub-area for receiving a heating procedure, a required duration of the heating procedure is significantly reduced while a satisfying drying effect is achieved.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Figure 1:
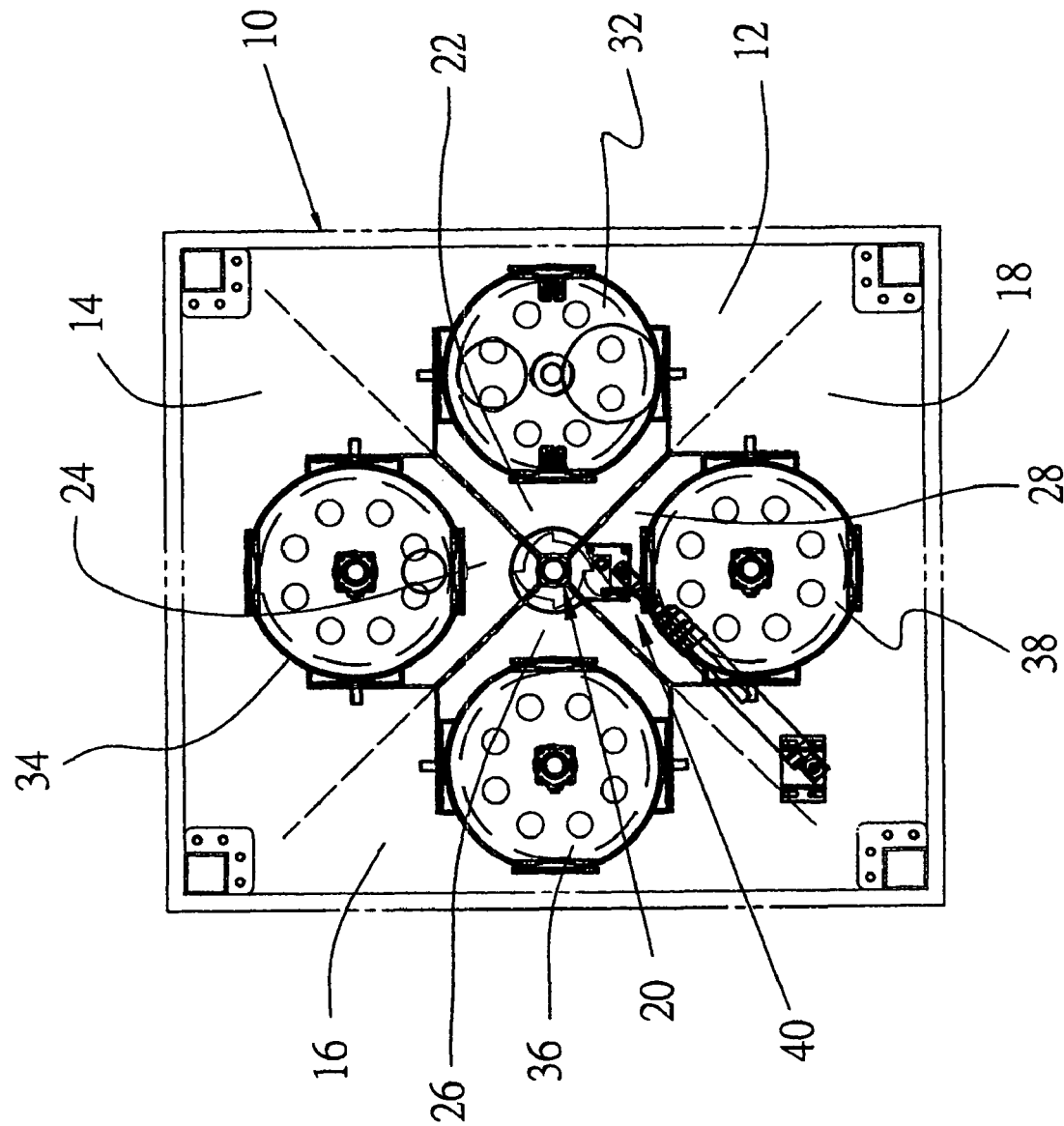
FIG. 1 is a schematic drawing structurally showing a vacuum drying apparatus of the present invention.

Please refer to FIG. 1. A drying apparatus of the present invention comprises a working area 10 containing a materialfilling-preheating sub-area 12, a heating sub-area 14, a drying sub-area 16, and a material-discharging sub-area 18. The material-filling-preheating sub-area 12 is where plastic material granules enters the drying apparatus and is where a hot air is provided to a cylinder for performing a preheating procedure. The heating sub-area 14 is where a high temperature and a great quantity of hot air are provided to a cylinder to heat the plastic material granules in the cylinder and evaporate water from the plastic material granules. The drying sub-area 16 provides a vacuum treatment so as to form a negative pressure environment inside the cylinder and make moisture contents drawn from the cylinder. The material-discharging sub-area 18 is where the plastic material granules are output.

A rotatable frame 20 is rotatably installed in the working area 10. More particularly, the rotatable frame 20 defines four accommodating spaces 22, 24, 26 and 28 which corresponds to the sub-areas 12, 14, 16 and 18 of the working area 10, respectively.

In each of the accommodating spaces 22, 24, 26 and 28, a cylinder is equipped to correspond to a said corresponding sub-area 12, 14, 16 or 18 of the working area 10. According to the corresponding sub-areas 12, 14, 16 and 18 the cylinders correspond to, the cylinders may be defined as a preheating cylinder 32, a heating cylinder 34, a vacuum drying cylinder 36, and a material-discharging cylinder 38.

A driving assembly 40 is connected to the rotatable frame 20 and thereby drives the rotatable frame 20 to rotate. The rotatable frame 20 thus rotates to shift the cylinders 32, 34, 36 and 38 from their currently corresponding sub-areas 12, 14, 16, and 18 to adjacent sub-areas 12, 14, 16, and 18.

Figure 2:
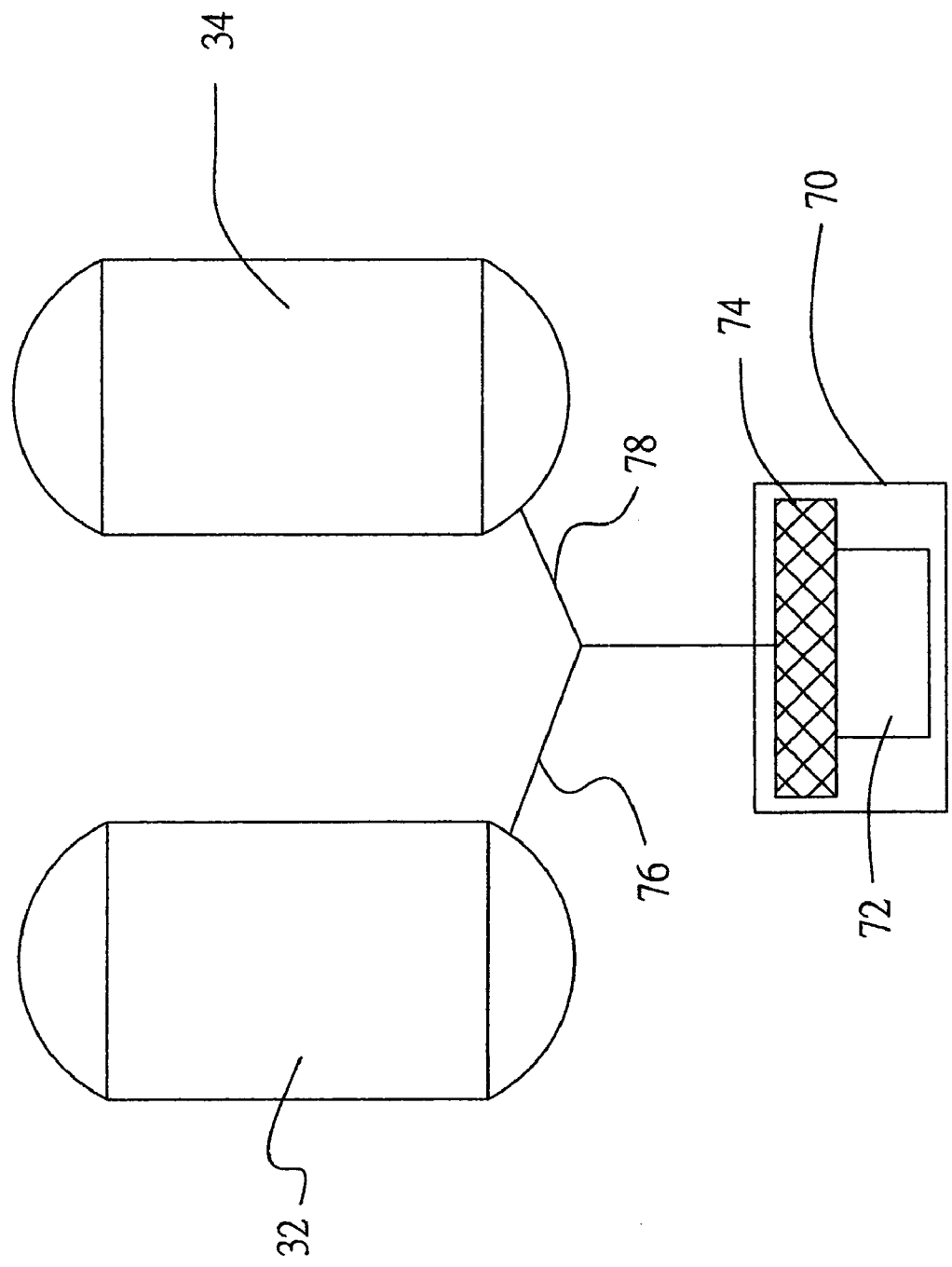
FIG. 2 is a schematic drawing showing a configuration of a preheating cylinder, a heating cylinder and a heating device according to the present invention.

Referring to FIG. 2, a heating device 70 comprising a blower 72 and a heater 74 serves to provide a hot air. In operation of the blower 72 and the heater 74, the hot air can enter the preheating cylinder 32 and the heating cylinder 34 through a first duct 76 and a second duct 78, respectively, wherein a quantity of the hot air entering the heating cylinder 34 is greater than a quantity of the hot air entering the preheating cylinder 32.

Figure 3:
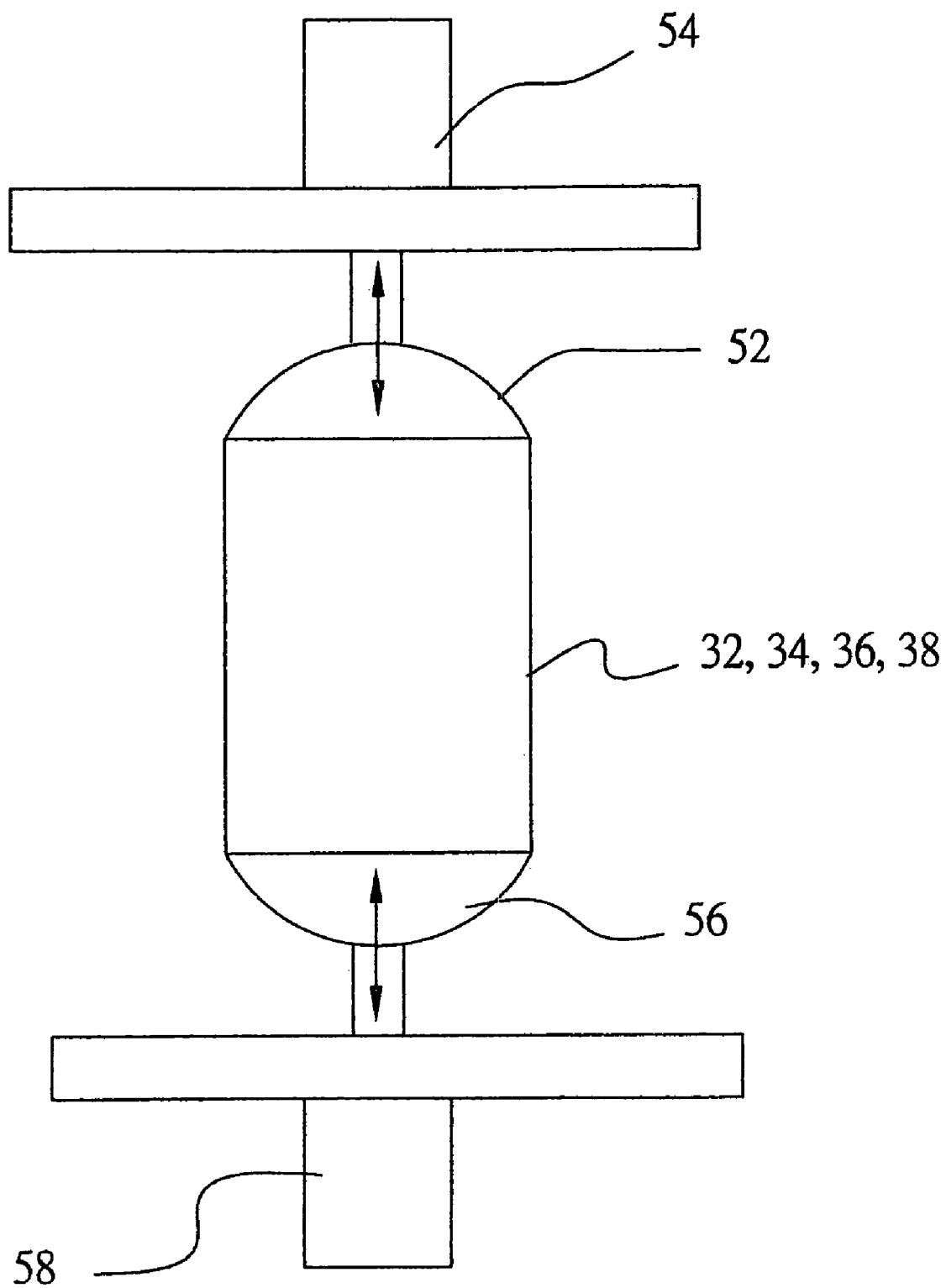
FIG. 3 is a schematic drawing showing a said cylinder sealed with a cover.

Now referring to FIG. 3, each of the preheating cylinder 32, the heating cylinder 34, the vacuum drying cylinder 36, and the material-discharging cylinder 38 has a seal assembly that comprises an upper cover 52 corresponding to an upper end of the cylinder and a lower cover 56 corresponding to a lower end of the cylinder. The upper cover 52 has one end connected to an extendable element 54 that controls the upper cover 52 to approach or leave the preheating cylinder 32, the heating cylinder 34, the vacuum drying cylinder 36, or the material-discharging cylinder 38. Similarly, the lower cover 56 is also equipped with an extendable element 58 so as to be controlled to approach or leave the preheating cylinder 32, the heating cylinder 34, the vacuum drying cylinder 36, or the material-discharging cylinder 38.

According to the present embodiment, four of the seal assemblies are provided in the material-filling-preheating sub-area 12, the heating sub-area 14, the drying sub-area 16, and the material-discharging sub-area 18 corresponding to the cylinders in the sub-areas. For preventing the material in the preheating cylinder 32, the heating cylinder 34, the vacuum drying cylinder 36, or the material-discharging cylinder 38 from running out when the cylinder is shifted between the sub-areas, a movable valve may be equipped to each said cylinder so that when the cylinder is shifted between the sub-areas, the movable valve closes the cylinder.

Figure 4:
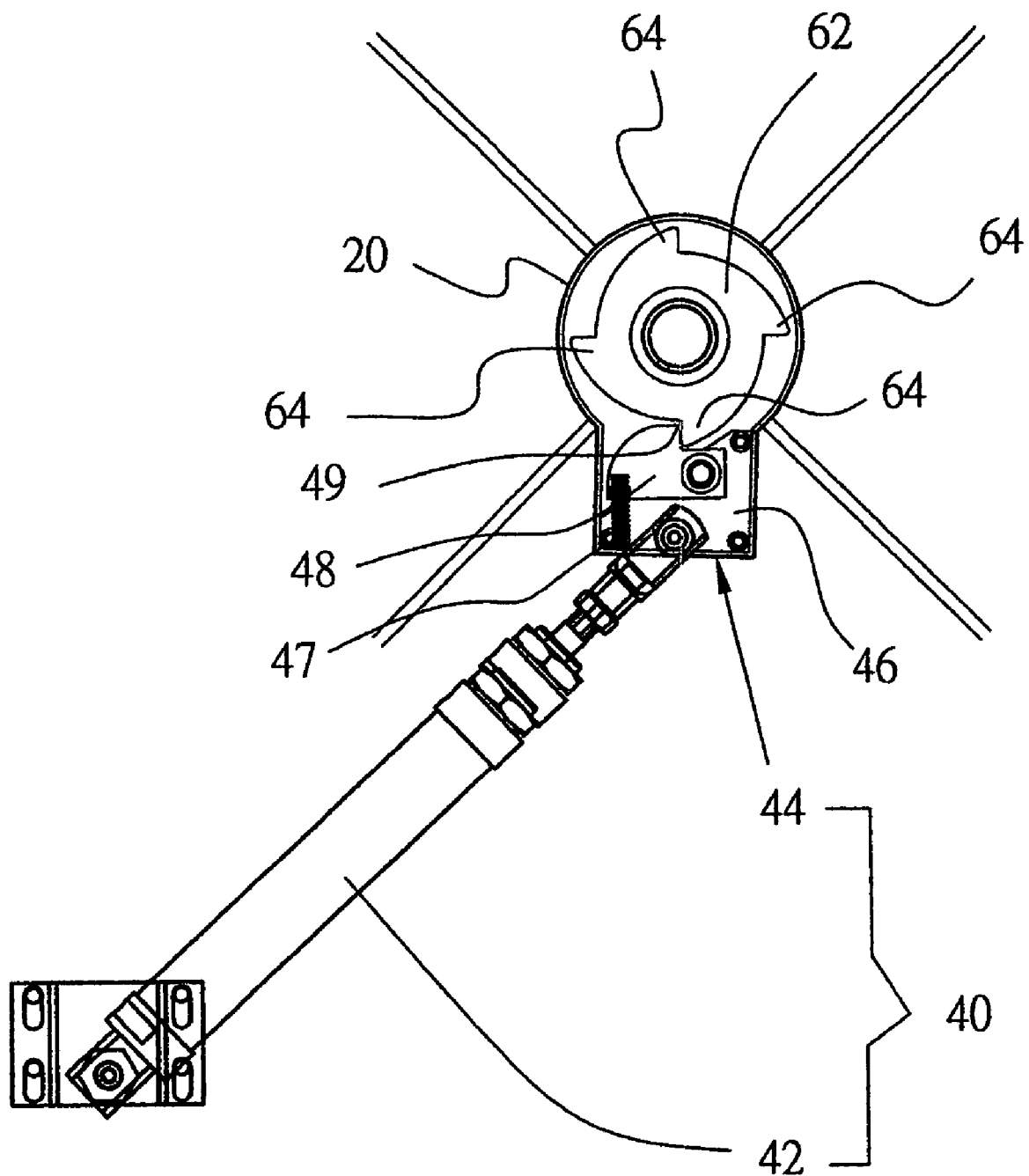
FIG. 4 is a schematic drawing showing a driving assembly and a toothed disk assembled.

As can be seen in FIG. 4, a toothed disk 62 having prominent teeth 64 at a periphery thereof is mounted at a top of the rotatable frame 20. In the present embodiment where the aforementioned four procedures are involved, the toothed disk 62 has four said teeth 64. The driving assembly 40 further comprises an extender 42 and a driver 44. More particularly, the driver 44 includes a pushing board 46 pivotally connected to one end of the extender 42, a pushing wing 48 rotatably connected to the pushing board 46, and a guiding spring 47 connected between the pushing wing 48 and the pushing board 46. The pushing wing 48 further has a toothed portion 49 for being engaged with one of the teeth 64 of the toothed disk 62.

Figure 5:
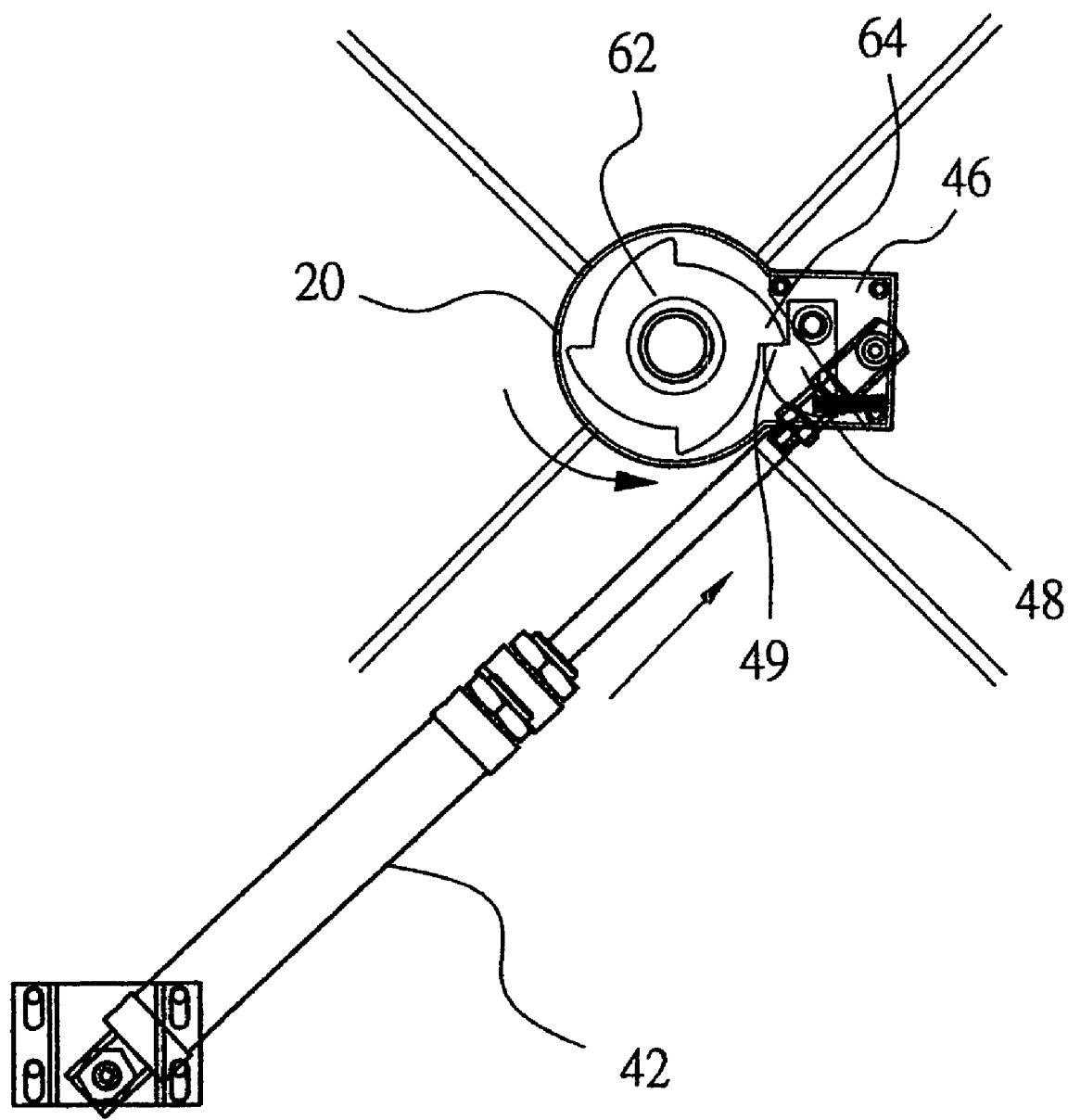
FIG. 5 is a schematic drawing showing the driving assembly stretched out.
Figure 6:
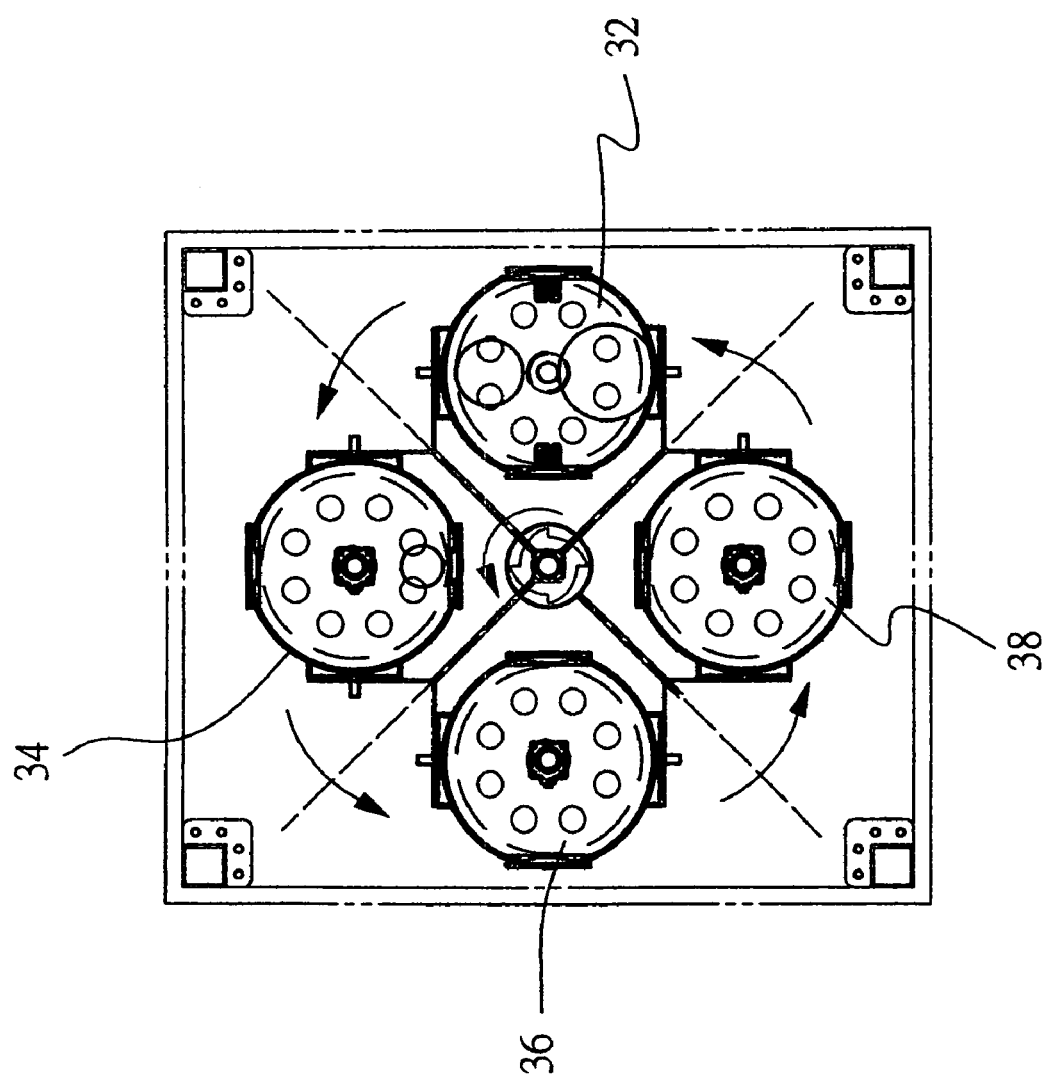
FIG. 6 is a schematic drawing showing the cylinders shifting among positions.

Reference is now made to FIGS. 5 and 6. When the extender 42 stretches out to push the pushing wing 48, the toothed portion 49 of the pushing wing 48 can exert a force to the disk 62 so as to rotate the disk 62 and the rotatable frame 20 and in turn drive the preheating cylinder 32, the heating cylinder 34, the vacuum drying cylinder 36, and the material-discharging cylinder 38 to move toward adjacent sub-areas. When the extender 42 retracts, the pushing board 46 swing back to a position as shown in FIG. 4.

By the above-disclosed structural configuration, in operation of the drying apparatus of the present embodiment, after material granules are loaded into the preheating cylinder 32 in the material-filling-preheating sub-area 12, part of the hot air output by the heating device 70 is introduced into the preheating cylinder 32 so as to form a relatively high heat environment inside the preheating cylinder 32.

Then the driving assembly 40 is started to rotate the rotatable frame 20 and returns to its initial position after the rotatable frame 20 rotates to move the preheating cylinder 32 from the material-filling-preheating sub-area 12 to the heating sub-area 14. At this time, since the preheating cylinder 32 presently corresponds to the heating sub-area 14, it is redefined as the heating cylinder 34. The heating cylinder 34 now in the heating sub-area 14 thus receives a greater part of the hot air output by the heating device 70. While the heating cylinder 34 has been preheated in the former procedure, the heating cylinder 34 can be now rapidly heated to a predetermined temperature that is adequate for evaporate moisture contents in the material granules in the heating cylinder 34.

After that, the driving assembly 40 is started again to move the heating cylinder 34 to the drying sub-area 16, and the heating cylinder 34 is redefined as the vacuum drying cylinder 36. Then an air-extracting device is used to form a negative pressure environment inside the vacuum drying cylinder 36 so as to rapidly draw the wet hot air inside the cylinder out, thereby drying the material granules.

Once again, the driving assembly 40 is started to rotate the rotatable frame 20 and thereby move the vacuum drying cylinder 36 receiving a vacuum drying procedure previously to the material-discharging sub-area 18. Thus the vacuum drying cylinder 36 is redefined as the material-discharging cylinder 38, where the dried material granules can be discharged for following processing procedures.

The present invention implements a continuous, circulative, batch drying measure to dry material granules. Since the preheating cylinder 32 has been preheated and reached a relatively high inside temperature, it only takes a relatively short time period to heat the preheated preheating cylinder 32 in the heating sub-area 14 to the predetermined temperature that is required for the heating drying procedure. Therefore, the present invention facilitates significantly reducing an overall duration for the drying procedure.

What is claimed is:

1. A vacuum drying apparatus of a circulative preheating type, comprising:
   a working area, containing a material-filling-preheating sub-area, a heating sub-area, a drying sub-area, and a material-discharging sub-area;

a rotatable frame, rotatably installed in the working area and having four accommodating spaces corresponding to the sub-areas of the working area, respectively;

a plurality of cylinders, installed in the accommodating spaces of the rotatable frame and corresponding to the sub-areas of the working area, in which the cylinders are defined as a preheating cylinder, a heating cylinder, a vacuum drying cylinder, and a material-discharging cylinder, respectively, according to the sub-areas the cylinders are corresponding to; and a driving assembly, connected to and thereby driving the rotatable frame to rotate;

wherein when the rotatable frame rotates, each of the cylinders is moved from a currently corresponding sub-area to an adjacent said sub-area, and the driving assembly comprises an extender and a driver in which the driver is settled at one end of the extender and includes a pushing board and a pushing wing that is rotatably connected to the pushing board.

2. The vacuum drying apparatus as claimed in claim 1, wherein a toothed disk is mounted to an end of the rotatable frame and has prominent teeth.

3. The vacuum drying apparatus as claimed in claim 1, further comprising a guiding spring connected between the pushing wing and the pushing board.

4. The vacuum drying apparatus as claimed in claim 1, further comprising four seal assemblies corresponding to the preheating sub-area, the heating sub-area, the drying sub-area, and the material-discharging sub-area, respectively, wherein each said seal assembly comprises an upper cover and a lower cover corresponding to an upper end and a lower end of the cylinder in the corresponding sub-area, respectively.

5. The vacuum drying apparatus as claimed in claim 4, further comprising a pair of extendable elements connected to the upper cover and the lower cover, respectively.

6. The vacuum drying apparatus as claimed in claim 1, further comprising a heating device, a first duct and a second duct, wherein the heating device serves to provide a hot air that is introduced into the preheating cylinder and the heating cylinder through the first duct and the second duct, respectively.

7. The vacuum drying apparatus as claimed in claim 6, wherein the heating device is a blower and a heater that are connected.

\* \* \* \* \*